2,975,032

PREPARATION OF CYANAMIDE

William R. Rolingson, Texas City, Tex., assignor to Monsanto Chemical Company, St. Louis, Mo., a corporation of Delaware No Drawing. Filed Nov. 12, 1958, Ser. No. 773,144

12 Claims. (Cl. 23—190)

The present invention relates to the preparation of cyanamide.

It has now been discovered that cyanamide is produced when methane or other gaseous hydrocarbon and ammonia are heated in contact with an inorganic, heat-stable adsorbent of high surface area such as alumina at a temperature within the range from about 400° C. to about 800° C. The cyanamide is formed on the surface of the adsorbent catalyst from which it may be recovered by conventional techniques such as leaching with water, for example.

The following examples illustrate the invention but are not to be construed as limiting it in any manner whatsoever.

Example 1

A quartz tube about 30 in. long and approximately 1 in. in diameter was employed as the reactor. A bed of catalyst consisting of activated alumina in pellet form about 2 in. in depth (15 g.) was supported within the reactor on a circular porous quartz plate located at about the midpoint of the tube. The reactor was heated by means of resistance wire wrapping covered by the necessary insulation. Temperatures in the tube and catalyst bed were recorded by means of a sliding iron-constantan thermocouple inserted in a quartz thermowell which extended through the catalyst bed.

The gaseous reactants, natural gas (containing 98% methane, 1.6% $C_2$'s and 0.4% $C_3$'s and ammonia, were fed through flowmeters at rates of approximately 0.5 mole and 1.0 mole per hr., respectively, mixed in a glass manifold and then passed into the reactor and through the catalyst bed which was heated to a temperature of about 400° C. Pressure in the reactor was maintained at essentially atmospheric. Total reaction time was about 1.5 hrs. At the end of this time, the reactor was cooled and the catalyst mass was removed and slurried in hot water to extract any cyanamide formed as an aqueous solution. The mixture was filtered and the pH of the filtrate was adjusted to about 4 by the addition of nitric acid. Aqueous silver nitrate was then added to the filtrate to precipitate any cyanides present. No precipitate was formed so the pH of the filtrate was then adjusted to 8.0 by the dropwise addition of ammonium hydroxide. This resulted in the precipitation of a small amount of silver cyanamide as a bright yellow solid. After filtering, washing, and drying, the silver cyanamide was subjected to infrared analysis and positively identified as this compound by comparison of its infrared spectrum with that of a known sample of silver cyanamide. Thus, conclusive evidence was provided that cyanamide had been deposited on the catalyst from the reaction of natural gas and ammonia.

Example 2

Following the procedure of Example 1, a series of runs were made in which natural gas and ammonia at flow rates of 0.5 mole per hr. and 1.0 mole per hr., respectively, were reacted over an alumina catalyst maintained at a temperature of about 650° C. over reaction periods ranging from 2 minutes to 2 hours. In every instance, cyanamide was recovered from the catalyst as silver cyanamide in the manner described in Example 1 and positively identified as such.

Example 3

In this experiment the catalyst bed in the reactor of Example 1 consisted of activated silica gel. The temperature of the bed was maintained at about 600° C. and ammonia and the natural gas used in the previous examples were passed through it at the same rates used in Example 1 for a period of one hour. Again, cyanamide was recovered from the catalyst as silver cyanamide and positively identified by infrared analysis.

Example 4

Another series of runs was made according to the procedure of Example 1 in which natural gas and ammonia were reacted at flow rates of 0.5 and 1.0 mole per hr., respectively, and at temperatures of 500° C., 700° C., 800° C., and 1000° C. Cyanamide was recovered and identified in its silver salt form in each of these runs.

Example 5

Research-grade methane (99.65%) and ammonia at flow rates of 0.5 mole and 1.0 mole per hr., respectively, were passed over an alumina catalyst maintained at a temperature of 700° C., in the reactor of Example 1 for about 15 minutes. The catalyst was extracted with water and the aqueous solution was treated as described above to recover the cyanamide formed as silver cyanamide. The bright yellow precipitate obtained was positively identified by infrared analysis.

Example 6

Research-grade ethane (99.9+%) and ammonia were passed at rates of 0.25 mole per hr. and 0.5 mole per hr., respectively, over alumina maintained at a temperature of 650° C. for a period of about 30 min. After extraction of the catalyst with water and treatment of the aqueous solution as previously described, a precipitate of silver cyanamide was obtained. The yield of cyanamide is slightly higher with ethane than with methane.

Example 7

The experiment of Example 6 was repeated substituting research-grade propane (99.9+%) for ethane. Slightly more cyanamide was recovered as the silver salt from this run using propane as the feed material.

The invention is not to be considered as limited to the specific conditions set forth in the examples since substantial variation may be made from these without departing from the scope of the invention. Suitable hydrocarbons, for example, include aliphatic, cycloaliphatic or aromatic hydrocarbons with the aliphatic hydrocarbons being preferred. In addition to the methane, ethane, and propane exemplified, there can be used as the reactant with ammonia, hydrocarbons such as ethylene, propylene, or butylene and other lower members of both the paraffin and alkylene series or mixtures containing the same such as for example, effluent gases obtained from the cracking of mineral and like oils or in separating the hydrocarbon mixtures derived from coke-oven gases, or fractions of such hydrocarbon mixtures. Hydrocarbons which are in the gaseous state at around 30° C. are preferred.

Any temperature in the range from about 400° C. to about 800° C. may be successfully employed. While some cyanamide is produced at 400° C., temperatures below 500° C. are generally considered somewhat impractical and economically unattractive. Temperatures above 800° C. on up to 1000° C. and above can also be used depending upon the stability of the catalyst. At the temperatures in the upper limit of the range, however, there is a general tendency toward disintegration of the catalyst. The preferred temperature range for the reaction is from about 550° C. to about 750° C.

The catalyst is not limited to the alumina and silica gel exemplified but can be any inorganic substance that provides a high surface area. Among the many such materials which are suitable are, for example, fuller's earth, kieselguhr, pumice, celite, kaolin, and the like.

The ratio of reactants may likewise vary. Preferably, stoichiometric amounts of the gaseous reactants are employed. However, excesses of one or the other may be employed if desired.

The reaction may be conducted at atmospheric or at super atmospheric pressures.

Either a batch or continuous process is feasible. Other conditions being equal, the yield of cyanamide varies with the reaction time in a fixed bed catalyst. As the cyanamide forms and deposits on the catalyst, the catalyst decreases in activity. The most practical type of operation from a commercial standpoint, therefore, appears to be a moving-bed type or the use of a fluidized catalyst technique. The product cyanamide may be readily recovered from the surface of the adsorbent catalyst by extraction with water or other known cyanamide solvents or by other means well known to those skilled in the art.

What is claimed is:

1. The process of preparing cyanamide which comprises heating together a mixture of aliphatic hydrocarbons having from 1 to 6 carbon atoms and ammonia in contact with an inorganic material of high surface area chosen from the group consisting of alumina, silica gel, fuller's earth, kieselguhr, pumice, celite, and kaolin at a temperature in the range from about 400° C. to about 800° C.

2. The process of claim 1 wherein said inorganic material of high surface area is alumina.

3. The proces of claim 1 wherein said inorganic material of high surface area is silica gel.

4. The process of preparing cyanamide which comprises heating together natural gas and ammonia in contact with an inorganic material of high surface area chosen from the group consisting of alumina, silica gel, fuller's earth, kieselguhr, pumice, celite, and kaolin at a temperature in the range from about 550° C. to about 800° C.

5. The process of claim 4 wherein said inorganic material is alumina.

6. The process of claim 4 wherein said inorganic material is silica gel.

7. The process of preparing cyanamide which comprises heating together methane and ammonia in contact with an inorganic material of high surface area chosen from the group consisting of alumina, silica gel, fuller's earth, kieselguhr, pumice, celite, and kaolin at a temperature in the range from about 400° C. to about 800° C.

8. The process of claim 7 wherein said inorganic material of high surface area is alumina.

9. The process of preparing cyanamide which comprises heating together ethane and ammonia in contact with an inorganic material of high surface area chosen from the group consisting of alumina, silica gel, fuller's earth, kieselguhr, pumice, celite and kaolin at a temperature in the range of from about 400° C. to about 800° C.

10. The process of claim 9 wherein said inorganic material of high surface area is alumina.

11. The process of preparing cyanamide which comprises heating together propane and ammonia in contact with an inorganic material of high surface area chosen from the group consisting of alumina, silica gel, fuller's earth, kieselguhr, pumice, celite, and kaolin at a temperature in the range from about 400° C. to about 800° C.

12. The process of claim 11 wherein said inorganic material of high surface area is alumina.

References Cited in the file of this patent

UNITED STATES PATENTS

| | | |
|---|---|---|
| 1,492,194 | Beindl | Apr. 29, 1924 |
| 1,920,795 | Jaeger | Aug. 1, 1933 |
| 2,721,786 | Boatright et al. | Oct. 25, 1955 |
| 2,835,556 | Boatright et al. | May 20, 1958 |